March 9, 1926.  
B. D. THOMAS  
1,576,012  
VARIABLE AREA WING STRUCTURE FOR AIRPLANES  
Filed April 26, 1923  
2 Sheets-Sheet 1
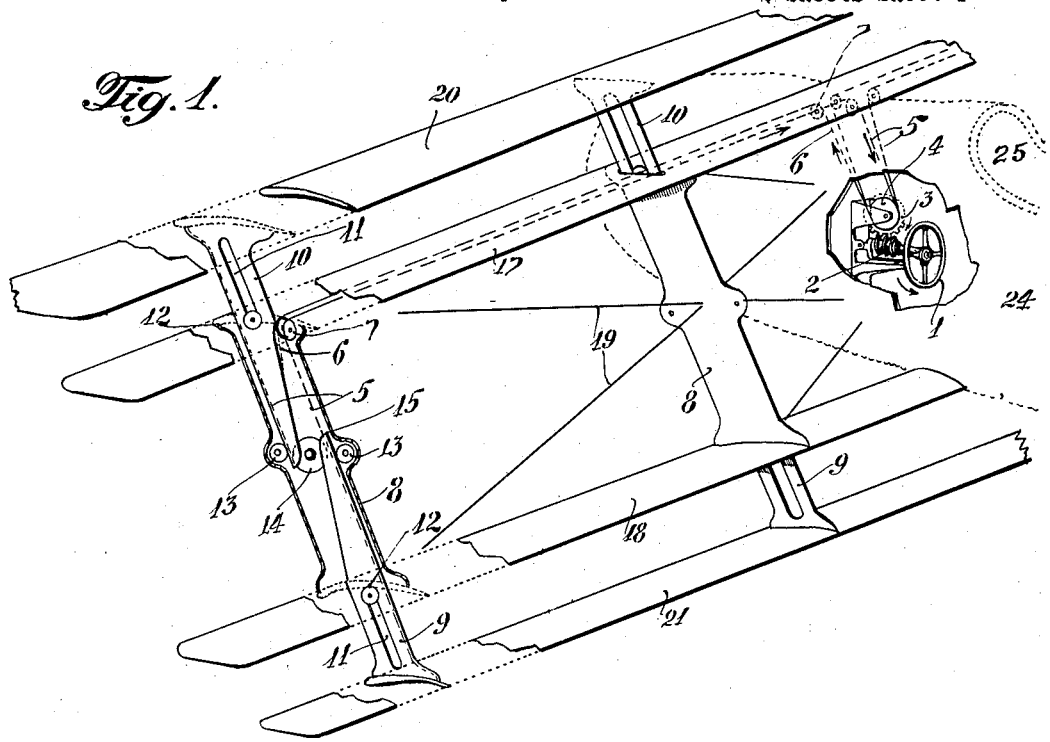
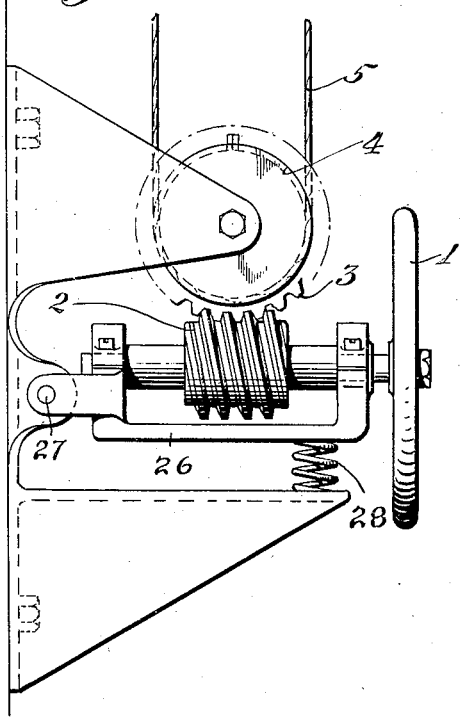
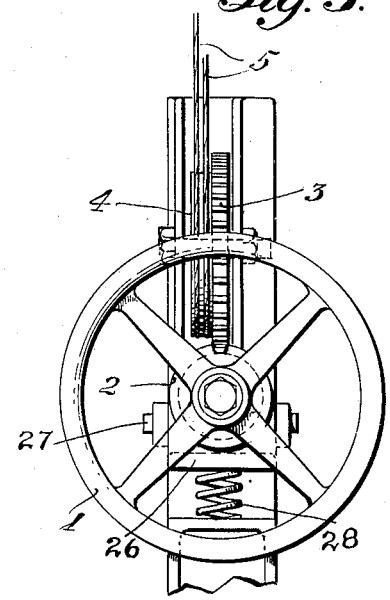
Inventor  
Benjamin Douglas Thomas  
By Attorney  
Edward Wright

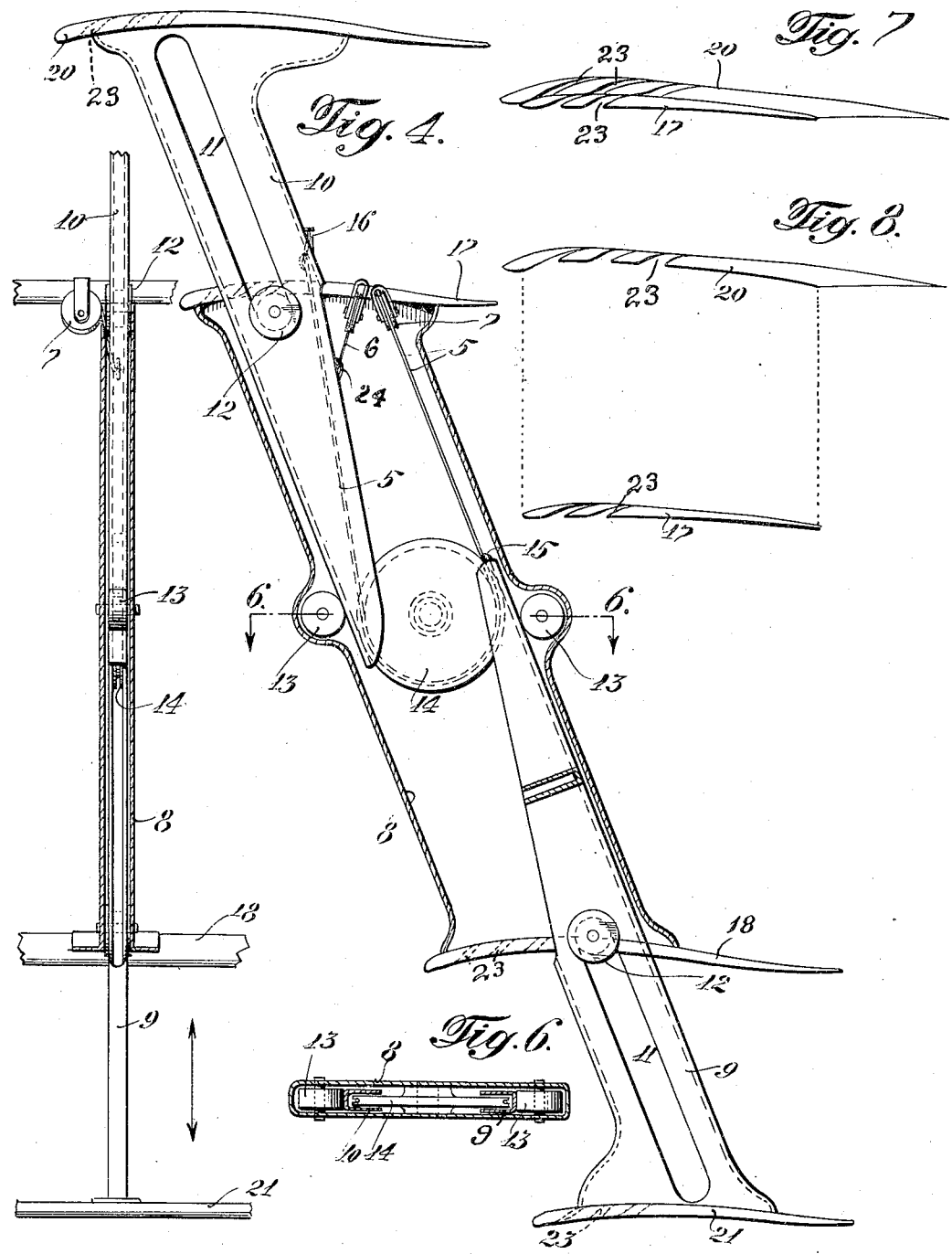

Patented Mar. 9, 1926.

1,576,012

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

VARIABLE AREA WING STRUCTURE FOR AIRPLANES.

Application filed April 26, 1923. Serial No. 634,688.

*To all whom it may concern:*

Be it known that I, BENJAMIN DOUGLAS THOMAS, of Ithaca, in the county of Tompkins and State of New York, have invented a certain new and useful Improvement in Variable Area Wing Structures for Airplanes, of which improvement the following is a specification.

This invention relates to airplane construction, and has for its object to provide an improved wing structure, whereby the area or exposed wing surface may be readily varied to suit different conditions of flight. It is well known that a large amount of exposed wing surface creates a considerable resistance and greatly impedes progress at high speeds, while on the other hand, a large wing area greatly increases the lift or power to rise and climb at lower speeds. It is, therefore, very desirable to have a variable wing area whereby the same may be adjusted for a large area or surface when starting, and for climbing, or whenever desired for greater lifting power, but adapted to be reduced to a small wing area for travelling at high speeds.

My invention, therefore, comprises a wing structure formed of two or more sections, or planes, adapted to be folded together, and superimposed one upon another, to constitute in effect a single wing, or to be separated and spread apart, thereby constituting double or multiple wing sections having a greater area and lifting power. Another feature of my invention comprises improved means for supporting the additional planes or wing surfaces, and for readily adjusting the same to vary the effective wing area.

In the accompanying drawings: Figure 1 is a perspective view of a variable area wing structure embodying my improvement; Fig. 2, a side elevation of the operating mechanism for the control cables; Fig. 3, a front elevation of the same; Fig. 4, a transverse section of the airplane taken through one of the main struts and showing the wings extended; Fig. 5, a vertical section, taken through one of the main struts at right angles to Fig. 4; Fig. 6, a horizontal section taken on the line 6—6 of Fig. 4; Fig. 7, a diagram showing the wing sections closed; and, Fig. 8, a diagram, indicating the wing sections open.

According to the construction shown, my improvement is illustrated in connection with a biplane type of airplane, having a stationary or fixed top plane, 17, a fixed bottom plane, 18, and intermediate struts, 8, which are made hollow and of necessary width, in order to provide sufficient stiffness for the structure and to form a housing for the extension struts of the movable planes and the guiding mechanism therefor. One or more movable planes may be employed, two being shown, the movable top plane, 20, having extension struts, 10, and the movable bottom plane, 21, having extension struts, 9, the extension struts having a telescoping movement within the main struts, 8.

Various forms of mechanism may be employed for guiding and operating the extension struts, and I have shown one such mechanism, comprising a central pulley, 14, outside guide rollers, 13, roller guides, 12, mounted in slots, 11, in the extension struts, and control cables, 5 and 6. The inner ends of the extension struts are tapered, and of a U-shaped section to engage upon opposite sides of the central pulley, 14, and between it and the respective side rollers, 13, 13, whereby the ends of the extension struts overlap each other when the same are drawn within the main strut, 8, for folding the wing sections or planes together. When the wing sections are folded, the movable planes are superimposed upon the stationary planes in such a manner that the two together form the contour of a single wing, as indicated in Fig. 7. Each control cable 5 is attached to both the extension struts in each of the hollow struts,—at 15 to the inner end of the lower extension strut and at 16 to the upper part of the upper extension strut, at which latter point there is provided a screw adjustment for taking up slack,— and passes around the pulley 14, over guide pulleys, 7, and through the top stationary plane, 17, to the fuselage, 24, where it passes around a drum, 4, operated by a gear, 3, worm, 2, and hand wheel, 1, this mechanism being mounted within reach of the pilot in the cock pit, 25. The frame, 26, carrying the worm, 2, and hand wheel, 1, is preferably hinged at 27 to the fixed support and the worm is normally held in engagement with the worm wheel by the supporting spring, 28. The other cable 6 is attached to the upper struts at point 24 and is also operated by drum 4.

As will be readily understood, the hand wheel is turned in one direction for operating the cables for extending the movable top and bottom planes to the open position, when it is desired to increase the exposed wing area, as in landing and climbing; and the wheel, 1, is turned in the opposite direction for operating the cables to shift the movable planes to the closed position when it is desired to travel at high speed. When it is desired to extend the movable planes suddenly, as in case of an emergency, the hand wheel with its frame, 26, may be thrown downward against the spring, 28, thereby releasing the worm, 2, from engagement with the worm wheel, 3, whereupon the super-imposed, or movable planes, will be instantly and automatically extended, as the movable planes are so proportioned as to area that this separation of the planes takes place automatically by means of the air pressure when the worm and worm wheel are disconnected.

The usual bracing wires, 19, may be employed for strengthening the airplane structure.

The main stationary planes and the extension planes may be provided with air openings or passages, 23, through the same, and arranged in staggered relation so that said openings are automatically closed when the planes are folded together, as indicated in Fig. 7.

These passages or slots, 23, which extend lengthwise of the planes afford additional lifting surface when the wings are open, but as these openings are closed when the planes are folded together, the resistance due to said openings is then eliminated when travelling at high speed.

Having now described my invention, what I claim as new and desire to secure by Letters Patent is:

1. In a variable area wing structure for airplanes, the combination with a fixed plane and hollow struts, of a movable plane, extension struts therefor telescoping into the hollow main struts, and pulleys within said hollow struts for guiding said extension struts.

2. In a variable area wing structure for airplanes, the combination with a fixed plane and hollow struts, of a movable plane, extension struts therefor telescoping into the hollow main struts, and cables extending into said hollow struts for operating said extension struts to open and close the wing.

3. In an airplane, the combination with a fixed plane and its supporting struts, of an extension plane adapted to lie in contact with said fixed plane to form in effect a single wing, struts secured to said extension plane and extending within said supporting struts, and guide pulleys journaled in the latter, the inner ends of said extension plane struts being grooved to fit some of said pulleys and the upper ends of the same being slotted to fit other of said pulleys.

4. In an airplane, the combination with fixed planes, hollow struts connecting the same, of an extension plane for each of said fixed planes, tapering grooved and slotted struts carrying said extension planes and slidable in said hollow struts, a guide pulley centrally journaled in each of the latter, the tapering grooved ends of a pair of extension plane struts fitting said pulley on opposite sides, and cable connections to said struts from a point adjacent the operator's seat to extend or retract said extension planes.

5. In an airplane, the combination with a fixed plane and hollow struts supporting the same, of an extension plane, struts carrying the same and telescoping into said hollow struts, a pulley in each hollow strut for guiding the ends of said telescoping struts, a cable passing around said pulley and attached to both of said telescoping struts to cause them to move simultaneously in opposite directions, another cable attached to the upper extension struts to lift the upper extension plane, a drum around which both said cables pass, and manual means to rotate said drum.

6. In the combination of claim 5, the means to rotate the drum comprising a worm and worm gear, a hand wheel on the worm shaft, a pivoted frame in which said shaft is journalled, and a spring supporting said frame to normally hold the worm in mesh.

7. In the combination of claim 5, said first cable having its ends adjustably attached to the upper extension struts, at points above the fixed plane when the extension plane is in operative position, and being attached at intermediate points to the inner ends of the lower extension struts, and the other cable being attached to said upper struts at points below the fixed plane, and guide pulleys for said cables carried by said fixed plane.

In testimony whereof I have hereunto set my hand.

BENJAMIN DOUGLAS THOMAS.